United States Patent [19]

Adams

[11] 4,250,909
[45] Feb. 17, 1981

[54] FLOW CONTROL VALVE

[75] Inventor: Frederick J. Adams, Avon, England

[73] Assignee: Cam Gears Limited, Hertfordshire, England

[21] Appl. No.: 951,587

[22] Filed: Oct. 16, 1978

[30] Foreign Application Priority Data

Oct. 17, 1977 [GB] United Kingdom ............... 43062/77

[51] Int. Cl.³ ........................................... G05D 11/03
[52] U.S. Cl. ................................................... 137/101
[58] Field of Search ................................. 137/87, 101

[56] References Cited

U.S. PATENT DOCUMENTS

| 2,266,921 | 12/1941 | Trautman | 137/101 |
|---|---|---|---|
| 2,643,664 | 6/1953 | Willett . | |
| 3,175,570 | 3/1965 | Voreaux | 137/101 |
| 3,370,602 | 2/1968 | Nelson | 137/101 |
| 3,421,533 | 1/1969 | Conn . | |
| 3,543,783 | 12/1970 | Ifield . | |
| 3,750,836 | 8/1973 | Kristof | 137/625.68 X |
| 3,924,650 | 12/1975 | Parquet . | |
| 3,955,473 | 5/1976 | Oxley . | |

FOREIGN PATENT DOCUMENTS

| 1530797 | 6/1969 | Fed. Rep. of Germany . |
|---|---|---|
| 2276206 | 6/1975 | France . |
| 549211 | 11/1942 | United Kingdom . |
| 599012 | 3/1948 | United Kingdom . |
| 833778 | 4/1960 | United Kingdom . |
| 885256 | 12/1961 | United Kingdom . |
| 1303700 | 1/1973 | United Kingdom . |
| 1502234 | 2/1978 | United Kingdom . |
| 1536435 | 12/1978 | United Kingdom . |

Primary Examiner—Robert G. Nilson

[57] ABSTRACT

A flow divider valve assembly and a power assisted steering system therewith. A spool (1) is axially slidable in a spool cylinder (2) within which it is biased (23, 24) to a neutral condition in which two control ports (13, 16) are open. A first of the control ports (13) is in a first fluid line which extends from an inlet port (8) by way of a first auxilliary chamber (11) to an outlet port (15) and the second control port (16) is in a second fluid line which extends from the inlet port (8) by way of a second auxilliary chamber (12) to a second outlet port (18). The outlet ports (15, 18) can be connected to opposite sides of a power assisting ram in a steering system. Communicating with the first fluid line downstream of the first control port (13) is a first primary chamber (19) formed on one side of the spool (1) and communicating with the second fluid line downstream of the second control port (16) is a second primary chamber (21) formed on the opposite side of the spool (1). The control ports (13, 16) are controlled by the spool (1) so that if fluid flow is resisted at one of the outlet ports (15, 18) fluid pressure develops in the primary (19, 21) and secondary (11, 12) chambers associated with that fluid line to subject the spool (1) to a pressure differential which causes it to be displaced axially from its neutral condition in a sense which progressively closes the control port (16, 13) of the other fluid line.

8 Claims, 3 Drawing Figures

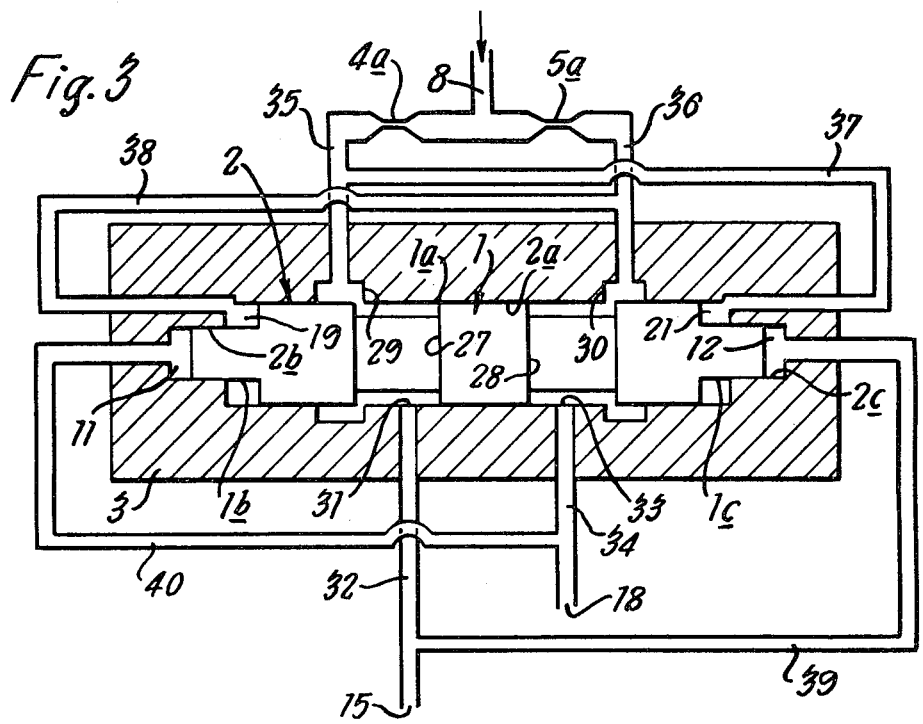

FLOW CONTROL VALVE

This invention relates to a valve assembly and a power assisted steering system which includes such an assembly. More particularly the invention is particularly concerned with a valve assembly capable of adjusting fluid flow to either or both of two outputs from a common fluid input.

According to the present invention there is provided a flow divider valve assembly comprising an inlet port, a first fluid line communicating from the inlet port by way of a first control port to a first outlet port, a second fluid line communicating from the inlet port by way of a second control port to a second outlet port; sensing means controlling said control ports and having a neutral condition in which both control ports and their respective fluid lines are open, and wherein the sensing means is responsive to fluid pressure in the first and second fluid lines and reacts in response to a differential developing between the fluid pressure in those lines to be adjusted from its neutral condition and cause the control port of the fluid line with the relatively lower fluid pressure to close while maintaining open the control port of the fluid line with the higher fluid pressure. Preferably the sensing means is responsive to fluid pressure detected at two positions in each fluid line, one position being upstream of the control port and the other position being downstream of the control part in the respective fluid lines so that in the event, for example, that one control port is fully closed while the inlet port is connected to fluid pressure and both outlet ports are free of restriction to fluid flow (for example by being open to communication with a fluid reservoir), the sensing means can detect fluid pressure at the position upstream of the closed central port and react in response to a fluid pressure differential which results therefrom to be adjusted to its neutral condition. Preferably the sensing means is biased to its neutral condition. In a preferred construction the sensing means comprises a spool which is axially slidable in a spool cylinder and forms therewith opposed spool chambers which are respectively expanded and contracted alternately during axial reciprocation of the spool in its cylinder. Of the said spool chambers, that or those which react in a similar sense when pressurised to displace the spool in one sense of direction communicate with the first fluid line, and that or those which react in a similar sense when pressurised to displace the spool in the opposite sense of direction communicate with the second fluid line and the spool chambers control displacement of the spool (from or towards its neutral condition) to control the opening and closing of the control ports in response to a differential developing between the fluid pressure in the first and second fluid lines.

Further according to the present invention there is provided a valve assembly comprising a spool axially slidable in a spool cylinder and forming therewith two opposed spool chambers which are respectively expanded and contracted alternately during axial reciprocation of the spool in its cylinder; a fluid inlet port communicating with two fluid lines which are remote from said spool chambers, a first of said fluid lines providing communication between the inlet port and a first outlet port and the second fluid line providing communication between the inlet port and a second outlet port; the first fluid line communicating with a first of the spool chambers which chamber contracts during axial displacement of the spool in one sense of direction and the second fluid line communicating with the second spool chamber which chamber contracts during axial displacement of the spool in the opposite sense of direction, and wherein the first fluid line includes a first control port which is progressively adjusted to close and open fluid flow through that line during axial displacement of the spool respectively in said one sense of direction and in the opposite sense of direction and the second fluid line includes a second control port which is progressively adjusted to open and close fluid flow through that line during axial displacement of the spool respectively in said one sense and in the opposite sense of direction, and wherein the spool has a neutral condition in which both control ports are open to permit fluid flow through their respective lines and the arrangement of the fluid lines and chambers is such that, upon an increase in resistance to fluid flow from the first outlet port relative to that from the second outlet port, fluid pressure develops in the first fluid line and in the first spool chamber to urge the spool axially in said opposite sense of direction from its neutral condition to progressively close the second control port and thereby communication between the inlet port and the second outlet port while communication is maintained through the first fluid line between the inlet port and the first outlet port and, upon an increase in resistance to fluid flow from the second outlet port relative to that from the first outlet port, fluid pressure develops in the second fluid line and in the second spool chamber to urge the spool axially in said one sense of direction from its neutral condition to progressively close the first control port and thereby communication between the inlet port and the first outlet port while communication is maintained through the second fluid line between the inlet port and the second outlet port.

Still further according to the present invention there is provided a power assisted steering system which comprises a valve assembly as specified in the immediately preceding paragraph and in which the first and second outlet ports communicate respectively with opposite sides of double acting power assistance means and the inlet port communicates with a source of hydraulic fluid under pressure.

The valve assembly of the present invention may conveniently be considered as an open centre flow divider valve whereby when the spool is located in a central or neutral condition relative to its cylinder, fluid flow presented to the inlet port is divided between the first and second fluid lines to provide fluid flow and pressure at both outlet ports (usually the fluid flow and pressure is arranged to be equal at the two outlet ports). Upon axial displacement of the spool from its aforementioned neutral condition one or other of the control ports is progressively closed to close fluid flow through the particular fluid line of which it forms part while the control port of the other fluid line remains open (and can, if required, be arranged to open progressively upon the aforementioned displacement of the spool) to maintain fluid flow through that fluid line with appropriate fluid pressure at its outlet port. The aforementioned axial displacement of the spool to vary the opening and closing of the respective control ports is achieved as a result of the spool being subjected to a fluid pressure differential, the pressure differential developing by the restriction or prevention of fluid flow from one or other of the outlet ports so that upon such restriction a pressure differential results in the two spool chambers which acts to displace the spool in a sense of direction which progressively increases the proportion of fluid pressure (available at the inlet port) which is directed to the outlet port from which flow is restricted or prevented.

In a preferred form of construction of the valve assembly each fluid line includes, or is in constant communication with, an auxiliary spool chamber (that is a chamber which is auxiliary to the previously mentioned (primary) spool chamber with which that fluid line communicates) which is formed between the spool and its cylinder. The two auxiliary spool chambers are opposed in the sense that during axial reciprocation of the spool they are respectively expanded and contracted alternately and consequently when subjected to fluid pressure can present a pressure differential on the spool. The auxiliary spool chambers are associated with their respective fluid lines so that when flow is restricted from the outlet port of one of the lines, fluid pressure which develops in that line can be transmitted to both the primary and auxiliary spool chambers which communicate with that line to develop a pressure differential on the spool which causes it to be dispaced axially in a sense of direction which closes the control port of the other fluid line. Preferably the pressurised areas on the axially directed spool faces which form part of the primary spool chambers are larger than the pressurised areas on the axially directed spool faces which form part of the auxiliary spool chambers. It is also preferred (a) that the pressurised area is substantially the same on each of the opposed axially directed spool faces which form part of the primary spool chambers and (b) that the pressurised area is substantially the same on each of the opposed axially directed spool faces which form part of the auxiliary spool chambers.

The primary spool chambers can communicate with their respective fluid lines at positions upstream or downstream of the control ports in those lines; however when the primary spool chambers communicate with their respective fluid lines at positions downstream of the control ports in those lines it is desirable that each fluid line includes an auxiliary spool chamber upstream of the respective control port in that line so that, should a control port fully close, fluid pressure which develops in the auxiliary spool chamber of that line will serve initially to move the spool in a sense of direction which opens the control port of that line and admit fluid pressure to the primary chamber with which that line communicates. If the primary spool chambers communicate with their respective fluid lines upstream of control ports then it is desirable that the fluid lines communicate with auxiliary spool chambers at positions downstream of the control ports.

Usually flow restrictors will be provided in the respective first and second fluid lines and it is preferred that these restrictors are located in their respective lines upstream of the control ports. It is also preferred that the spool chambers (primary and, when provided, auxiliary) communicate with their respectively associated fluid lines at positions downstream of the restrictors provided in such lines.

As previously mentioned, axial displacement of the spool to control fluid flow to and pressure at the outlet ports is achieved by subjecting the spool to a fluid pressure differential in the opposed spool chambers. If required, the spool can be biased (for example by mechanical springs, resilient material or fluid pressure) in both senses of axial direction to its central or neutral condition so that the pressure differential to which the spool has to be subjected by fluid pressure in the spool chambers must exceed a predetermined value determined by the biasing force and "stiction" prior to the spool being displaced to effect an adjustment to a control port.

By the term "fluid" as used throughout the present Specification we mean a gas or a liquid so that, for example, the valve may be used pneumatically or hydraulically and it will be realised that sealing arrangements and other minor modifications as are necessary for use of the valve with gas or liquid will be apparent to persons skilled in the relevant art.

Embodiments of valve assemblies constructed in accordance with the present invention will now be described, by way of example only, with reference to the accompanying illustrative drawings, in which:

FIG. 3 is an axial section through a further valve assembly constructed in accordance with a second embodiment of the invention.

Where possible throughout the following description the same parts or members as referred to in each of the Figures have been accorded the same references.

The valve assembly of the present invention was primarily developed for use with a power assisted steering system of motor vehicles whereby hydraulic fluid derived from a single source such as a motor driven pump could be divided and directed to both sides of appropriate power assistance means such as an hydraulically actuated ram and for convenience the present examples will be discussed in relation to such application.

Figure 1:
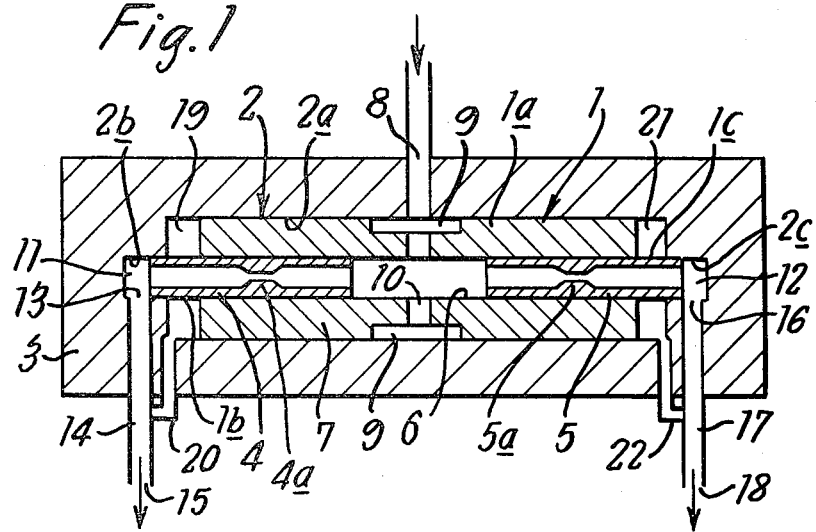
FIG. 1 is an axial section through a valve assembly constructed in accordance with a first embodiment.

In the example shown in FIG. 1 the valve assembly comprises a spool 1 which is axially slidable in a spool cylinder 2 formed by a valve body 3. The spool cylinder 2 is stepped to provide a central bore part 2a and smaller diameter end bore parts 2b and 2c. The spool 1 is stepped similarly to its cylinder to provide a central part 1a and smaller diameter end parts or spigots 1b and 1c which are respectively axially slidable in the cylinder parts 2a, 2b and 2c. To facilitate its manufacture the spool 1 is constructed as a three part assembly whereby the spigot parts 1b and 1c are formed by cylindrical tubes 4 and 5 respectively which are partly received in and secured to an axially extending bore 6 in a spool block 7. The bores of the tubes 4 and 5 are provided with flow restrictors 4a and 5a respectively.

The valve body 3 has an inlet port 8 for connection to the outlet of the hydraulic pump (not shown). The port 8 is in constant communication with an annular recess 9 in the spool 1 which recess communicates through a passage 10 with the central bore 6 of the spool and therefrom through the bores of the tubes 4 and 5 to be in constant communication with opposed auxiliary spool chambers 11 and 12 respectively which are formed between the ends of the spigots 1b and 1c and the ends of the spool cylinder parts 2b and 2c within which those spigots are respectively received. The spool chamber 11 is intended to communicate by way of a control port 13 and passage 14 with an outlet port 15. Similarly the spool chamber 12 is intended to communicate by way of a control port 16 and passage 17 with an outlet port 18. With the spool 1 in its central or neutral condition as drawn in FIG. 1, fluid entering the port 8 from the pump will be divided to pass to the outlet port 15 by way of a first fluid line formed by the bore 6, flow restrictor 4a, auxiliary spool chamber 11, control port 13 and passage 14 and also to pass to the outlet port 18 by way of a second fluid line formed by the bore 6, the flow restrictor 5a, auxiliary spool chamber 12, control port 16 and passage 17. Consequently if the condition of one fluid line is the same as that for the other the same fluid pressure and flow will be available at the outlet ports 15 and 18.

Formed between one end of the spool cylinder part 2a, adjacent end face of the spool part 7 and cylindrical surface of the spigot 1b is a primary spool chamber 19 which is in constant communication by way of passage 20 with the passage 14 and thereby with the outlet port 15. Similarly, at the other end of the spool cylinder part 2a this is formed between the adjacent end face of the spool part 7 and the cylindrical surface of the spigot 1c, a primary spool chamber 21 which is in constant communication by way of a passage 22 with the passage 17 and thereby with the outlet port 18.

The control ports 13 and 16 are arranged so that, with the spool 1 in its central or neutral condition, they communicate with chambers 11 and 12 respectively. However, upon axial displacement of the spool from its neutral condition one or other of the control ports 13 and 16 is progressively closed by the full diameter of the spigot 1b or 1c moving over that control port so that in an extreme condition the control ports 13 and 16 can be closed by their associated spigots 1b and 1c respectively.

In use of the valve assembly shown in FIG. 1 in a power assisted steering system the outlet ports 15 and 18 can be coupled to opposed sides of a double acting hydraulic ram (which is a convenient form of power assistance means in a conventional steering system). In the absence of any requirement for power assistance the resistance to fluid flow at outlet ports 15 and 18 will be substantially the same so that, in an open centre system, fluid flow from the outlet ports 15 and 18 can be circulated through each of the opposed chambers of the ram to a reservoir. When a steering manoeuvre is effected and power assistance is required the appropriate side of the ram is subjected to fluid pressure. Consequently, say that the operation of the ram is such that there is resistance to fluid flow from the outlet port 15 while port 18 maintains communication with the reservoir. As the resistance to fluid flow from the outlet port 15 increases so does fluid pressure in the chamber 19 and the part of the fluid line to which that chamber is connected downstream of the restrictor 4a and since chambers 12 and 21 communicate with the reservoir the spool 1 is subjected to a pressure differential causing it to move rightwardly in the drawing and progressively close control port 16. Upon control port 16 becoming fully closed the whole flow from the hydraulic pump at the inlet port 8 is directed through the first fluid line to outlet port 15 and thereby provides maximum pressure to actuate the ram and provide power assistance. Upon removal of the resistance to fluid flow from outlet port 15 and both outlet ports 15 and 18 being subjected to the same pressure conditions, chambers 11, 19 and 21 communicate with the reservoir while pressure develops in chamber 12 (control port 16 being closed) and the spool 1 is subjected to a pressure differential causing it to move leftwardly in the drawing until it attains its central condition. Conversely, if the flow from outlet port 18 is subjected to resistance during operation of power assistance it will be realised that the spool reacts in a similar manner to that previously described except that it is displaced leftwardly from its central condition to close control port 13 and upon removal of the aforementioned resistance returns automatically to its neutral condition.

Figure 2:
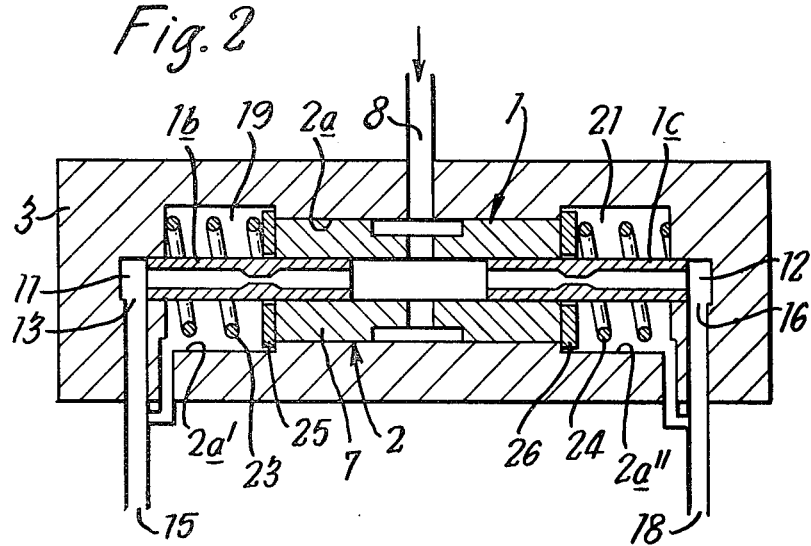
FIG. 2 is a similar section to that shown in FIG. 1 and illustrates a modification for the valve assembly to incorporate spring centring of the spool.

In the embodiment of FIG. 1 the spool 1 is displaced axially from its central condition upon the pressure differential to which it is subjected becoming sufficient to overcome the stiction between the spool and its cylinder. If required however the spool 1 can be spring loaded against axial displacement in either sense of direction from its neutral condition so that movement of the spool will commence only when the pressure differential is sufficient to overcome the stiction as aforementioned and the spring loading to which the spool is subjected and such a modification is shown in FIG. 2 where chambers 19 and 21 house helical springs 23 and 24 respectively. The spring 23 reacts between the end of the cylinder part 2a and an annular plate 25 which is slidably received on the spigot 1b and is axially slidable in an enlarged diameter cylinder part 2a' of the cylinder part 2a. Similarly the spring 24 reacts between the other end of the cylinder part 2a and an annular plate 26 which is slidably received on the spigot 1c and is axially slidable in an enlarged diameter cylinder part 2a" of the cylinder part 2a. The springs 23 and 24 bias the spool 1 to its central condition where the plates 25 and 26 abut against the opposed ends of the spool part 7. To effect axial displacement of the spool 1 from its central condition it is necessary for a pressure differential to develop across the ends of the spool (as previously discussed) which is sufficient to overcome the biasing effect of one of the springs and also that of stiction (which can be regarded as negligible). Consequently upon displacement of the spool, say leftwardly in the drawing, the spool part 7 carries with it the annular plate 25 to compress spring 23 while spring 24 is without effect and merely serves to bias plate 26 against the shoulder formed between the cylinder parts 2a and 2a". It will be realised that the converse effect occurs upon displacement of the spool rightwardly in the drawing when spring 24 is compressed and plate 25 is retained by spring 23 against the shoulder formed between the cylinder parts 2a and 2a'.

In the embodiment shown in FIG. 3 the spool 1 is solid and of similar configuration to that shown in FIG. 1 whereby end spigots 1b and 1c are axially slidable in cylinder parts 2b and 2c respectively to form therewith auxiliary chambers 11 and 12 respectively while the central spool part 1a is axially slidable in cylinder part 2a to form therewith primary chambers 19 and 21. In addition the spool part 1a is provided with axially spaced annular recesses 27 and 28 which serve to control the opening and closing of axially spaced annular control ports 29 and 30 respectively in the cylinder part 2a. With the spool in its central condition as drawn the recess 27 communicates with port 29 and also with a port 31 which latter communicates with the first outlet port by way of passage 32; in addition recess 28 communicates with control port 30 and with a port 33 which latter communicates by way of passage 34 with the second outlet port 18.

In accordance with the invention, the inlet port 8 communicates with two fluid lines so that the divided flow can pass through a first line formed by restrictor 4a in a passage 35, which communicates with control port 29, annular recess 27, port 31 and passage 32 and also through a second line formed by restrictor 5a in passage 36 which communicates with control port 30, annular recess 28, port 33 and passage 34. It will be noted, unlike the embodiment in FIG. 1, that the restrictors 4a and 5a are incorporated at positions remote from the spool 1. The passage 35 is in constant communication at a position downstream of the restrictor 4a and by way of a passage 37 with the primary spool chamber 21; similarly the passage 36 at a position downstream of restrictor 5a is in constant communication by way of a passage 38 with primary spool chamber 19. In addition passage 32 is in constant communication with auxiliary spool chamber 12 by way of a passage 39 and passage 34 is in constant communication with auxiliary spool chamber 11 by way of a passage 40.

As previously mentioned when the spool is in its central condition control port 29 communicates with port 31 by way of recess 27 and control port 30 communicates with port 33 by way of recess 28; upon displacement of the spool from its central condition leftwardly in the drawing port 29 is incresingly opened to recess 27 and thereby to communication with port 31 (which communication is maintained when the spool is displaced to its maximum extent leftwardly in the drawing). During such leftward displacement of the spool the control port 30 is progressively closed to communication with recess 28 and thereby port 33 by that control port being obturated by the full diameter of the spool part 1a so that, in the extreme leftward position of the spool, port 30 is fully closed. Conversely, upon displacement of the spool rightwardly in the drawing from its central position control port 30 is increasingly opened to recess 28 and thereby to communication with port 33 (which communication is maintained until and when the spool is displaced to its extreme righthand position) while during such displacement the control port 29 is progressively closed to recess 27 so that when the spool is at its extreme righthand position the control port 29 is fully closed by the full diameter part 1a of the spool 1. When the valve assembly of FIG. 3 is incorporated in a power assisted steering system in a similar manner to that described with reference to the assembly of FIG. 1, the spool 1 will be located in its central condition for so long as the outlet ports 15 and 18 are subjected to the same fluid flow conditions. Upon, say, a resistance being applied to the flow of fluid from outlet port 15 a fluid pressure increase will develop in the first fluid line downstream of the restrictor 4a. This increase in fluid pressure is without effect at the control port 29 and in the recess 27 but is transmitted by way of passage 39 to chamber 12 and by way of passage 37 to chamber 21, since chambers 11 and 19 communicate with the free flow outlet port 18 the spool 1 is subjected to a pressure differential causing it to be displaced leftwardly in the drawing to progressively close control port 30 (and thereby the second fluid line) while control port 29 is progressively opened to recess 27 and thereby port 31. Consequently fluid pressure from the hydraulic pump is increasingly directed through the first fluid line to the outlet port 15; in an extreme condition with port 30 fully closed the whole output from the pump is directed to the outlet port 15 for maximum power assistance. It will be noted that as control port 30 is progressively closed and restriction to fluid flow through the second fluid line increases, fluid pressure increases in the passage 36 downstream of the restrictor 5a and thereby in the passage 38 and chamber 19 so that when port 30 is fully closed the pressure of fluid in chamber 19 may be higher than the pressure of fluid in chamber 21. The chamber 11 maintains communication with free flow of fluid from the outlet port 18 while chamber 12 contains fluid under pressure. The spool is thus subjected to a pressure differential which displaces it towards or maintains it at its lefthand end of stroke in the drawing.

Upon removal of the resistance to fluid flow from the outlet port 15 (so that both ports 15 and 18 are subjected to the same flow conditions) fluid pressure in chambers 12 and 21 reduces to that of the fluid pressure in chamber 11; however since port 30 is closed (or in a more closed condition than control port 29) chamber 19 will be subjected to a higher fluid pressure than chamber 21 and consequently the spool will be subjected to a pressure differential causing it to move rightwardly in the drawing until its central condition is reached.

It will be apparent to persons skilled in the art that upon outlet port 18 being subjected to a flow restriction while port 15 maintains a relatively unrestricted flow the spool 1 will be displaced rightwardly to increasingly direct fluid pressure from the pump to the outlet port 18 and the spool will thereafter be returned to its neutral condition upon the resistance to fluid flow being removed from port 18 (in a similar manner to that previously described for a relative increase in resistance to fluid flow being applied to the outlet port 15 as compared with that at the outlet port 18).

It will be seen from the drawings that the spool in each of the aforegoing examples is symmetrically formed (as is the spool cylinder) and the spool end faces (against which fluid pressure from the respective chambers is applied axially) are of a larger surface area in the primary chambers (19, 21) than in the auxilliary chambers (11, 12).

I claim:

1. A flow divider valve comprising a valve housing having an inlet and first and second outlets, a cylindrical passage within said housing, a spool valve member axially slidable within said cylindrical passage for dividing a flow from said fluid inlet into first and second outlet flows and for maintaining said outlet flows in a predetermined constant ratio regardless of back pressure in said outlets, said spool valve member having a central passage through which fluid flows from said inlet to said first and second outlets, said spool valve member having first and second surfaces against which fluid pressure acts, said spool valve member moving in one direction in said passage in said valve housing in response to an excess of fluid pressure acting on said first surface over the fluid pressure acting on said second surface to effect throttling at a first location of said first outlet flow, said valve spool member moving in a second direction in said passage in said valve housing in response to an excess of fluid pressure acting on said second one of said surfaces over the pressure acting on said first one of said surfaces to effect throttling at a second location of said second outlet flow, a passage communicating the fluid pressure in said first outlet from a location downstream of said first throttling location to said second surface, a passage communicating the fluid pressure in said second outlet from a location downstream of said second throttling location to said first surface, and first and second fixed-area flow restrictors, said first fixed-area flow restrictor being disposed between said inlet and said first fluid outlet upstream of said first throttling location, whereby the fluid forming said first outlet flow flows through said first fixed-area flow restrictor and said second fixed-area flow restrictor being disposed between said inlet and said second fluid outlet upstream of said second throttling location whereby the fluid forming said second outlet flow flows through said second fixed-area flow restrictor, said first and second fixed-area flow restrictors each having a constant cross sectional area through which fluid may flow regardless of the axial position of said spool valve member in said passage.

2. A flow divider valve as set forth in claim 1 wherein first and second surfaces of said spool valve member comprise first and second annular end faces of said spool valve member, said spool valve member further including first and second cylindrical extensions extending in axially opposite directions from said spool valve member, said first and second cylindrical extensions each having a central axial passage therethrough through which fluid flowing from said inlet to said first and second outlets, respectively, flows, said first throttling location being between an end of said first extension and said housing and said second throttling location being between an end of said second extension and said housing.

3. A flow divider as set forth in claim 2 wherein said cylindrical passage in said housing includes first and second reduced diameter portions in which said first and second cylindrical extensions are slidably received.

4. A flow divider valve as set forth in claim 2 wherein said axial passages through said first and second cylindrical extensions include reduced cross sectional areas forming said first and second fixed area flow restrictors.

5. A flow divider valve as set forth in claim 4 wherein said first and second cylindrical extensions comprise tubular members inserted into said central passage in said valve spool member.

6. A flow divider valve as set forth in claim 4 wherein each of said cylindrical extensions includes an axially outer end face upon which acts the pressure of fluid upstream of a respective one of said first and second throttling locations and downstream of a respective one of said first and second fixed-area flow restrictors.

7. A flow divider valve as set forth in claim 6 wherein said inlet includes a passage through said housing into said central passage through said housing, said valve spool member includes a groove along the exterior of said valve spool member in fluid communication with said passage through said housing and a passage communicating between said groove and said central passage through said spool.

8. A flow divider valve as set forth in claim 4 further including biasing means for biasing said valve spool member toward a central position in said passage in said housing.

* * * * *